(12) United States Patent
Rao

(10) Patent No.: US 11,616,762 B2
(45) Date of Patent: Mar. 28, 2023

(54) METHOD AND SYSTEM FOR VOICE BASED APPLICATION BLOCKER

(71) Applicant: ARRIS Enterprises LLC, Suwanee, GA (US)

(72) Inventor: Banala Venkat Rao, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 23 days.

(21) Appl. No.: 17/228,771

(22) Filed: Apr. 13, 2021

(65) Prior Publication Data

US 2022/0029961 A1 Jan. 27, 2022

Related U.S. Application Data

(60) Provisional application No. 63/055,942, filed on Jul. 24, 2020.

(51) Int. Cl.
*H04L 29/06* (2006.01)
*H04L 9/40* (2022.01)

(52) U.S. Cl.
CPC ........ *H04L 63/0263* (2013.01); *H04L 63/029* (2013.01); *H04L 63/108* (2013.01)

(58) Field of Classification Search
USPC .......................................................... 726/1
See application file for complete search history.

(56) References Cited

U.S. PATENT DOCUMENTS

| | | | |
|---|---|---|---|
| 9,148,408 B1* | 9/2015 | Glazemakers | H04L 63/20 |
| 2019/0341026 A1* | 11/2019 | Visser | G10L 25/63 |
| 2020/0349639 A1* | 11/2020 | Mousseau | G06Q 20/04 |
| 2020/0356725 A1* | 11/2020 | Okonkwo | G06F 40/117 |
| 2021/0224183 A1* | 7/2021 | Péan | H04L 43/20 |

* cited by examiner

*Primary Examiner* — Sanchit K Sarker
(74) *Attorney, Agent, or Firm* — Panitch Schwarze Belisario & Nadel LLC

(57) ABSTRACT

A method, a system, and a non-transitory computer readable medium are disclosed for a voice based application blocker. The method includes receiving, on a gateway, a text message from a mobile device; tokenizing, on a processor of the gateway, the text message into at least a user and a purpose, the purpose being denying or granting access of the user to one or more applications from the gateway; and creating, on a firewall of the gateway, blocking rules for the user to the one or more applications from the gateway.

18 Claims, 5 Drawing Sheets

US 11,616,762 B2

METHOD AND SYSTEM FOR VOICE BASED APPLICATION BLOCKER

TECHNICAL FIELD

The present disclosure generally relates generally to a method and system for a voice based application blocker.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

Subscribers connect their computers, routers, voice-over-IP telephones and other devices to this network through the network terminals, for example, cable modems (CM) or network gateways. The network terminals, for example, cable modems (CM) or network gateways include hardware which runs software that provides the low-level control for the device's specific hardware, which is known as firmware.

In certain environments, the administrator (e.g., primary user of the CPE broadband device) may wish to block a user, for example, from accessing streaming application from a desired time or timeslot (e.g., 4 PM to 8 PM), give another user full access to the Internet, block another user from dating applications, and/or allow a user access to only certain applications, for example, for educational purposes.

SUMMARY

In accordance with exemplary embodiments, it would be desirable to have a system and method that can control access to the Internet, for example, for members of a family with voice commands using a mobile device.

In accordance with an aspect, a method is disclosed for a voice based application blocker, the method comprising: receiving, on a gateway, a text message from a mobile device; tokenizing, on a processor of the gateway, the text message into at least a user and a purpose, the purpose being denying or granting access of the user to one or more applications from the gateway; and creating, on a firewall of the gateway, blocking rules for the user to the one or more applications from the gateway.

In accordance with an another aspect, a broadband device is disclosed, the broadband device comprising: a processor configured to: receive a text message from a mobile device; tokenize the text message into at least a user and a purpose, the purpose being denying or granting access of the user to one or more applications from the broadband device; and creating a firewall with blocking rules for the user to the one or more applications.

In accordance with a further aspect, a non-transitory computer readable medium having instructions operable to cause one or more processors to perform operations comprising: receiving, on a gateway, a text message from a mobile device; tokenizing, on a processor of the gateway, the text message into at least a user and a purpose, the purpose being denying or granting access of the user to one or more applications from the gateway; and creating, on a firewall of the gateway, blocking rules for the user to the one or more applications from the gateway.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for a Voice Based Application Blocker

Figure 1:
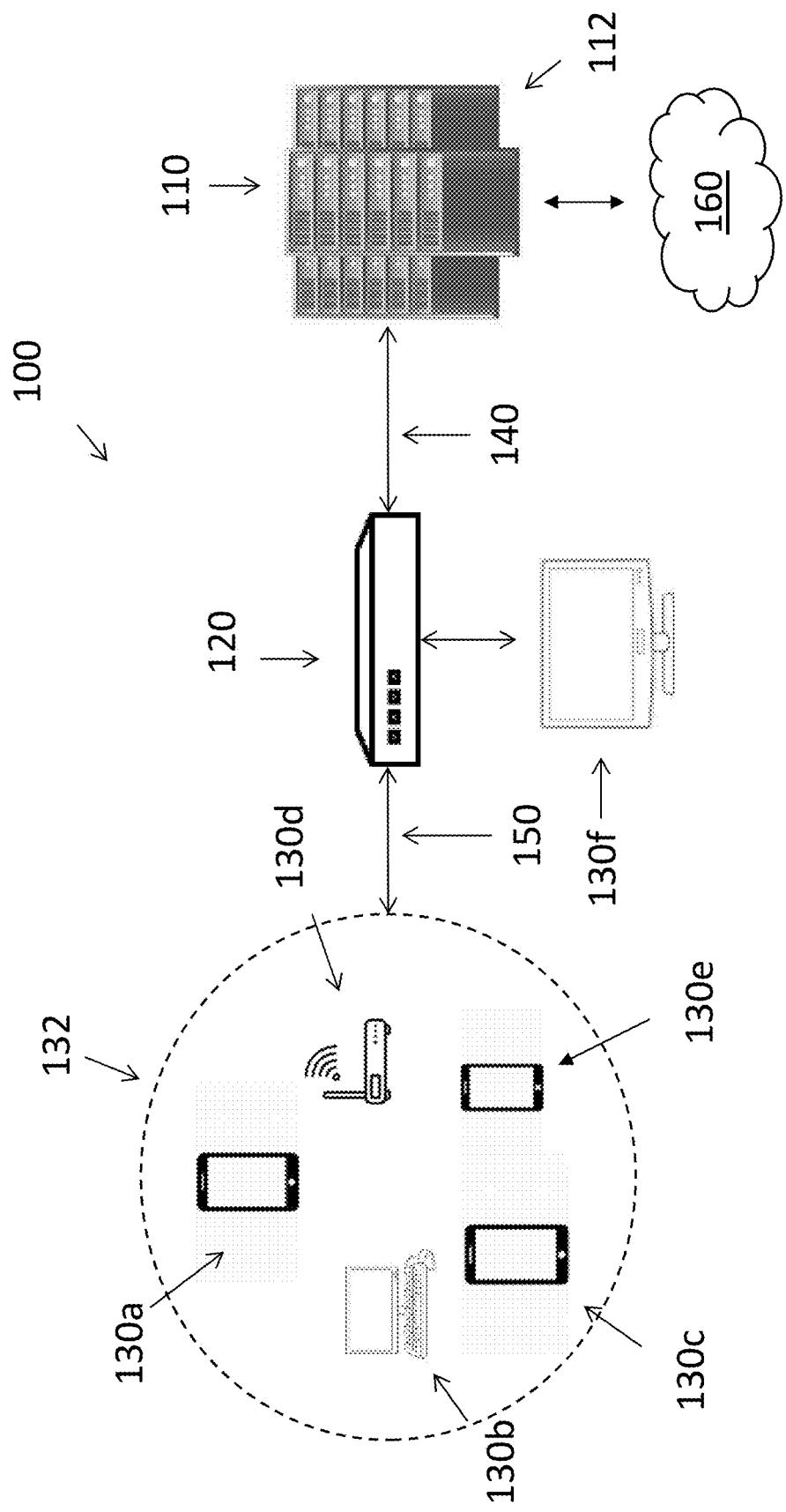
FIG. 1 is an illustration of an exemplary network environment for a system and method for a voice based application blocker for a customer-premise equipment or customer-provided equipment (CPE) broadband devices.

FIG. 1 is a block diagram illustrating an example network environment 100 operable for a voice based application blocker for a customer-premise equipment or customer-provided equipment (CPE) broadband devices 120. In accordance with an exemplary embodiment, the customer-premise equipment or customer-provided equipment (CPE) broadband device 120 can include, for example, a network gateway in the form of a modem/router/MTA device configured to provide voice, data, and video services. In embodiments, the CPE broadband device 120 can provide, for example, video and/or data services to a plurality of devices 130a, 130b, 130c, 130d, 130e, 130f. The CPE broadband device 120 may communicate with the plurality of devices 130a, 130b, 130c, 130d, 130e over a local network 132 (for example, a local area network (LAN), a wireless local area network (WLAN), a personal area network (PAN), etc.) and/or wired, for example, a television 130e connected to a modem, and may communicate with an upstream wide area network (WAN) 160 through a connection 150 to a cable provider 110. The cable provider 110 can provide high-bandwidth data transfer, for example, cable television and broadband Internet access via, for example, coaxial cables 140. The cable provider 110 can include one or more servers 112 configured to deliver services, for example, cable television and/or broadband Internet and infrastructure supporting such services including management of image software and/or firmware.

In accordance with an exemplary embodiment, the CPE broadband device 120 and the plurality of devices 130a, 130b, 130c, 130d, 130e, 130f can be configured to connect via a wireless network, for example, wireless network utilizing an IEEE 802.11 specification, including a set-top box (STB), a smart phone, a smart TV, a computer, a mobile device, a tablet, a router, a home security system, or any other device operable to communicate wirelessly with the CPE broadband device 120. The CPE broadband device 120 may provide access to an external network, such as the Internet, for any devices connected thereto via the area network 132. The area network 132 may be, for instance a local area. In accordance with an exemplary embodiment, the CPE broadband device 120 may be a gateway device, an access point, a modem, a wireless router including an embedded modem, a wireless network extender or any other device operable to deliver, for example, data and/or video services from the provider 110 and/or a wide area network (WAN) 160 to one or more of the plurality of devices 130a, 130b, 130c, 130d, 130e, 130f.

In accordance with an exemplary embodiment, the CPE broadband device 120 may communicate with the provider 110 over a wired or a wireless connection. A wireless connection between the provider 110 and the CPE broadband device 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Figure 2:
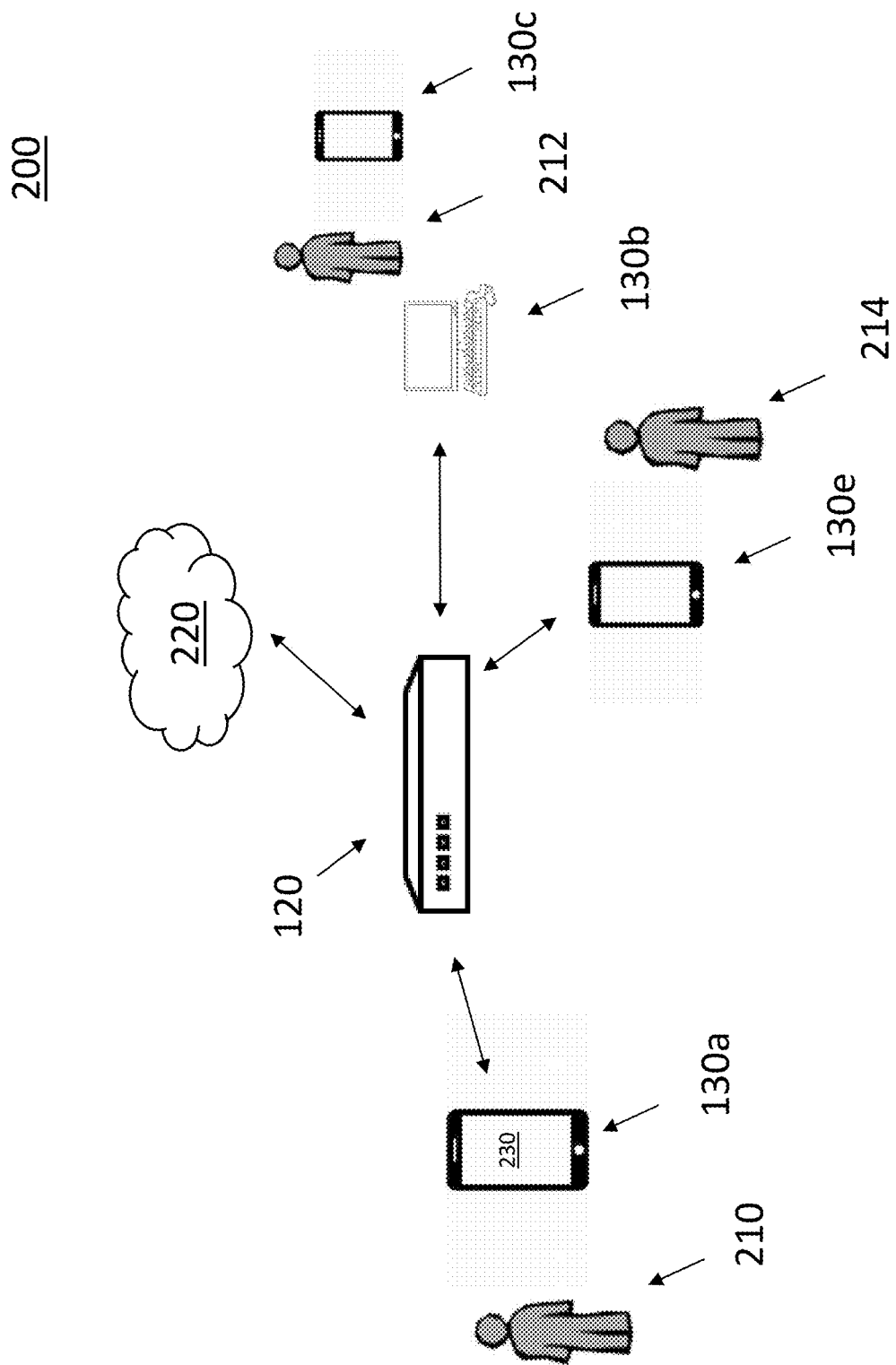
FIG. 2 is an illustration of an exemplary system for a voice based application blocker for a customer-premise equipment or customer-provided equipment (CPE) broadband devices.

FIG. 2 is an illustration of an exemplary system for a voice based application blocker for a customer-premise equipment or customer-provided equipment (CPE) broadband devices 120, for example, a gateway. As shown in FIG. 2, an administrator 210 of a customer-premise equipment or customer-provided equipment (CPE) broadband device 120 can restrict other users 212, 214 (e.g., family members) to access to one or more applications by voice command. For example, the administrator (e.g., primary user of the CPE broadband device 120) may wish to block one or more users from certain application at certain times and/or alternatively, allow users with full access at all time. In accordance with an embodiment, the administrator 210 can control access with a voice based application blocker application 230 that is uploaded onto a mobile device 130a, which communicates with the CPE broadband device 120 via, for example, a wireless communication protocol. In accordance with an embodiment, the mobile device 130a includes a speech to text application that converts voice messages from the administrator 210 into text that can be sent to the CPE broadband device 120.

In accordance with an embodiment, the CPE broadband device 120 can be configured to include a user-space utility program, for example, iptables of IPv4, which allows an administrator to configure the IP packet filter rules of the Linux kernel firewall, implemented as different Netfilter modules. In accordance with an embodiment, the filters can be organized in different tables, which contain chains of rules for how to treat network traffic packets. For example, different kernel modules and programs can be used for different protocols, for example, ip6tables to IPv6, arptables to Address Resolution Protocol (ARP), and ebtables to Ethernet frames. In an embodiment, the user-space utility application can grant users 212, 214, and their corresponding devices 130b, 130c, and 130e access to one or more applications hosted for example, on a cloud server 220. As shown in FIG. 2, each of the one or more users 210, 212, 214, may have one or more devices, for example, user 212 may have a computer 130b and a mobile device or smartphone 130c that may be denied access or granted access to one or more applications as disclosed herein. In accordance with an embodiment, the one or more applications can include applications, websites, media-service providers, steaming services, on-line video sharing platforms, on-line gaming platforms, on-line dating applications, WiFi access, Internet access, etc.

Method for Voice Based Application Blocker

Figure 3:
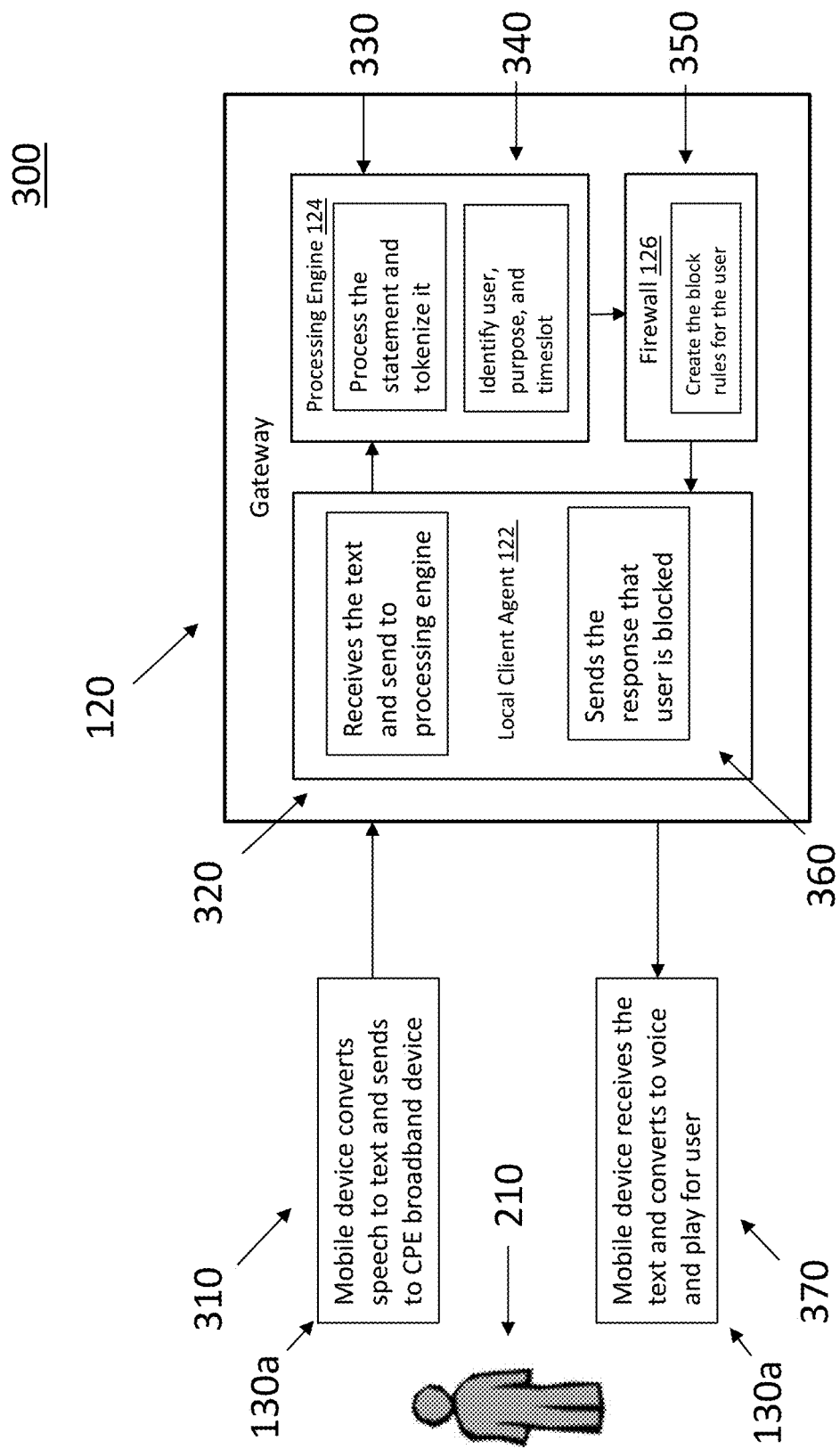
FIG. 3 is a block diagram of a CPE broadband device illustrating a voice based application blocker in accordance with an exemplary embodiment.

FIG. 3 is a block diagram of a CPE broadband device 120 illustrating a voice based application blocker in accordance with an exemplary embodiment. As shown in FIG. 3, an administrator 210 speaks (e.g., a voice command) into a smartphone 130 that access to an application is to be granted or denied for one of the other users 212, 214 of the CPE broadband device 120. For example, the administrator 210 can request that user 212 be denied access to Netflix's® from 4:00 PM to 8:00 PM. In step 310, the mobile device 130a, for example, a smartphone, converts the speech to text using an application hosted on the mobile device 130a and sends the converted text to the CPE broadband device 120. In step 320, the text is received, for example, on a local client agent 122 within the CPE broadband device 120, which forwards the text to a processing engine 124. In step 330, the processing engine 124 receives the text and processes the statement (e.g., "Deny user 212 access to Netflix's") and tokenizes the text. In accordance with an embodiment, tokenization of the text is the process of tokenizing or splitting a string, text into a list of tokens. For example, the tokenization can be performed using text natural language processing, for example, using artificial intelligence, information engineering, and/or human-computer interaction to process the text into tokens. In step 340, the processing engine identifies the user (e.g., user 212), purpose (e.g., deny access to Netflix's), and if provided, a timeslot (4:00 PM to 8:00 PM).

In accordance with an embodiment, the CPE broadband device 120 includes a natural language processing library or database that correlate the tokenized text with the one or more users, the one or more devices associated with the one or more users, and the one or more applications such that blocking rules as disclosed herein can be established. For example, common terminology such as "my son" or "name of son", and applications, for example, Netflix's, can be correlated with users 210, 212, 214, devices 130a, 130b, 130c, 130d, 130e, and applications including uniform resource locators (URL), web addresses, and/or application port numbers. For example, the library or database can also include a database of web addresses, and/or application port numbers, for example, for blocking access to web surfing (e.g., HTTP and HTTPS, ports 80, 443, 8080), email (e.g., IMAP, port 143), File Transfer Protocol (e.g., FTP, ports 20 to 21), etc., that can be identified with natural language processing.

In step 350, the identified user, purpose, and timeslot, for example, using the natural language processing library is sent to the firewall 126, which creates blocking rules for the user (e.g., user 220), for example, using iptables. The blocking rules, can include, for example, blocking, on the gateway, one or more devices of the user from accessing the one or more applications from the gateway, or granting, on the gateway, the one or more devices of the user access to the one or more applications from the gateway. In accordance with an exemplary embodiment, the firewall can be any network security system that monitors and controls incoming and outgoing network traffic based on predetermined security rules. In step 360, a response is sent to the mobile device 130a that the user 212, 214 is blocked and/or granted access as requested. In step 370, the mobile device 130a receives the text message and converts the text to voice, which is played for the user 210.

Figure 4:
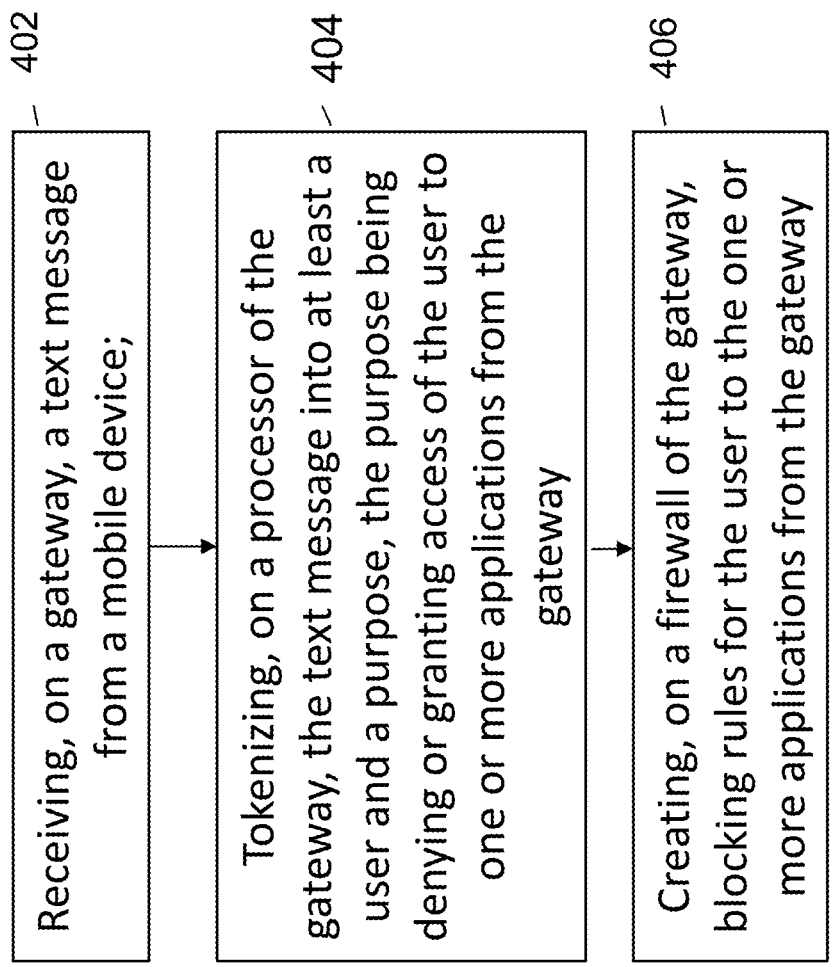
FIG. 4 is a flowchart illustrating an exemplary embodiment of a voice based application blocker.

FIG. 4 is a flowchart 400 illustrating an exemplary embodiment of a voice based application blocker. As shown in FIG. 4, in step 402, a text message from a mobile device is received on a gateway. In step 404, the text message is tokenized, for example, by a processor, into at least a user and a purpose, the purpose being denying or granting access of the user to one or more applications from the gateway. In step 406, blocking rules for the user to the one or more applications from the gateway are created on a firewall of the gateway.

In accordance with an embodiment, a text message can be sent from the gateway to the mobile device that confirms that the user to the one or more applications from the gateway that the blocking rules have been created. The text message received from the mobile device can further include a timeslot, the timeslot being a period of time in which the user is being denied or granted access to the one or more applications from the gateway. In accordance with an embodiment, the timeslot can be tokenized on the processor of the gateway, and the blocking rules can be created for the user to the one or more applications from the gateway with the timeslot.

In accordance with an embodiment, one or more devices for the user of the gateway can be registered on the gateway, and the one or more devices can be associated on the gateway for the users in the creating of the blocking rules for the user to the one or more applications from the gateway. The blocking rules for the user can include blocking, on the gateway, one or more devices of the user from accessing the one or more applications from the gateway, or granting, on the gateway, the one or more devices of the user access to the one or more applications from the gateway.

In accordance with an embodiment, the blocking rules can be implemented using a user-space utility program. In addition, a natural language processing library configured to convert tokenized text into the creation of the blocking rules for the user to the one or more applications from the gateway can be stored on the gateway as disclosed herein.

Computer System Architecture

Figure 5:
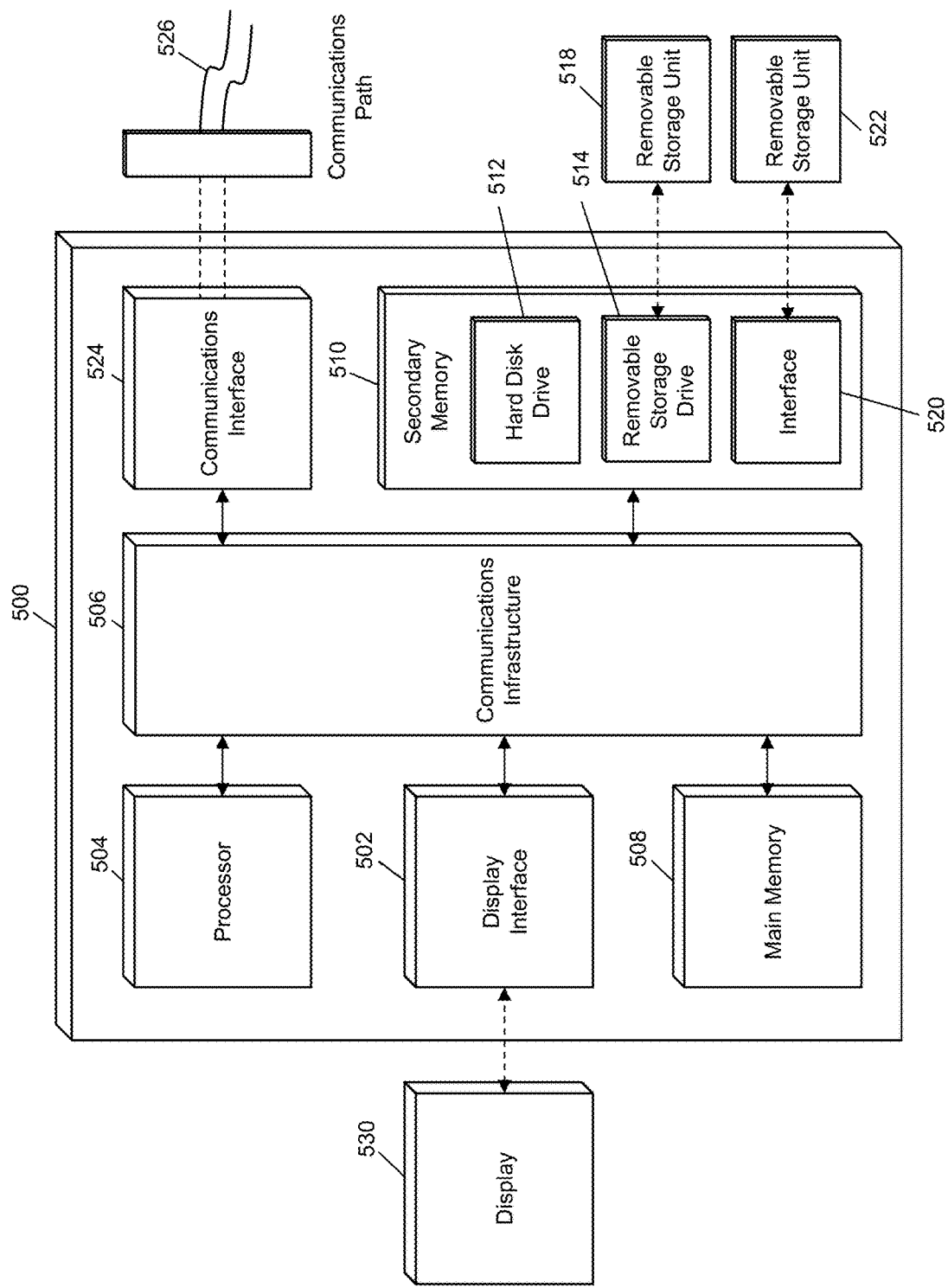
FIG. 5 is an exemplary hardware architecture for an embodiment of a communication device.

FIG. 5 illustrates a representative computer system 500 in which embodiments of the present disclosure, or portions thereof, may be implemented as computer-readable code executed on a processor of a computer. For example, the one or more servers 112, the CPE broadband device 120, and the plurality of devices 130a, 130b, 130c, 130d, 130e, of FIGS. 1, 2, and 3 may be implemented in whole or in part by a computer system 500 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 618 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 1-4, as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for a voice based application blocker. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for an application blocker, the method comprising:
    storing, on the gateway, a natural language processing library;
    receiving, on a gateway, a text message from a mobile device, the text message including text identifying a user and a purpose, the purpose being denying or granting access of the user to one or more applications from the gateway;
    tokenizing, on a processor of the gateway, the text of the text message using natural language processing, the text identifying the user and the purpose of the text message; and
    creating, on a firewall of the gateway, blocking rules for the user to the one or more applications from the gateway; wherein creating the blocking rules includes:
        correlating, by the gateway, the tokenized text with the user, one or more devices associated with the user, and the one or more applications based on the natural language processing library.

2. The method according to claim 1, further comprising:
    sending, from the gateway, a text message to the mobile device that confirms that the user to the one or more applications from the gateway that the blocking rules have been created.

3. The method according to claim 1, wherein the text message further includes text identifying a timeslot, the timeslot being a period of time in which the user is being denied or granted access to the one or more applications from the gateway, the method comprising:
    tokenizing, on the processor of the gateway, the timeslot text; and
    creating, on the firewall, the blocking rules for the user to the one or more applications from the gateway with the timeslot.

4. The method according to claim 1, further comprising:
    registering, on the gateway, the one or more devices for the user of the gateway; and associating, on the gateway, the one or more devices for the users in the creating of the blocking rules for the user to the one or more applications from the gateway.

5. The method according to claim 1, wherein the blocking rules for the user comprises:
blocking, on the gateway, one or more devices of the user from accessing the one or more applications from the gateway; or
granting, on the gateway, the one or more devices of the user access to the one or more applications from the gateway.

6. The method according to claim 1, further comprising:
implementing, on the gateway, the blocking rules using a user-space utility program.

7. A broadband device, the broadband device comprising:
a processor; and
a memory, the memory operatively coupled to the processor and storing computer-executable instructions, that when executed by the processor, cause the processor to:
store a natural language processing library;
receive a text message from a mobile device, the text message including text identifying a user and a purpose, the purpose being denying or granting access of the user to one or more applications from the broadband device;
tokenize the text of the text message using natural language processing, the text identifying the user and the purpose of the text message; and
create a firewall with blocking rules for the user to the one or more applications; wherein the instructions to create the blocking rules includes instructions to cause the processor to:
correlate the tokenized text with the user, one or more devices associated with the user, and the one or more applications based on the natural language processing library.

8. The broadband device according to claim 7, wherein the processor is further configured to:
send a text message to the mobile device that confirms that the user to the one or more applications from the broadband device that the blocking rules have been created.

9. The broadband device according to claim 7, wherein the text message further includes text identifying a timeslot, the timeslot being a period of time in which the user is being denied or granted access to the one or more applications from the broadband device; and wherein the memory includes further instructions to cause the processor to:
tokenize the timeslot text; and
create on the firewall, the blocking rules for the user to the one or more applications from the broadband device with the timeslot.

10. The broadband device according to claim 7, wherein the memory includes further instructions to cause the processor to:
register the one or more devices for the user of the broadband device; and
associate the one or more devices for the users in the creating of the blocking rules for the user to the one or more applications from the broadband device.

11. The broadband device according to claim 7, wherein the blocking rules for the user include instructions to cause the processor to:
block one or more devices of the user from accessing the one or more applications from the broadband device; or
grant the one or more devices of the user access to the one or more applications from the broadband device.

12. The broadband device according to claim 7, wherein the memory includes further instructions to cause the processor to:
implement the blocking rules using a user-space utility program.

13. A non-transitory computer readable medium having instructions operable to cause one or more processors to perform operations comprising:
storing, on the gateway, a natural language processing library;
receiving, on a gateway, a text message from a mobile device, the text message including text identifying a user and a purpose, the purpose being denying or granting access of the user to one or more applications from the gateway;
tokenizing, on a processor of the gateway, the text of the text message using natural language processing, the text identifying the user and the purpose of the text message; and
creating, on a firewall of the gateway, blocking rules for the user to the one or more applications from the gateway; wherein creating the blocking rules includes:
correlating, by the gateway, the tokenized text with the user, one or more devices associated with the user, and the one or more applications based on the natural language processing library.

14. The non-transitory computer readable medium according to claim 13, further comprising:
sending, from the gateway, a text message to the mobile device that confirms that the user to the one or more applications from the gateway that the blocking rules have been created.

15. The non-transitory computer readable medium according to claim 13, wherein the text message further includes text identifying a timeslot, the timeslot being a period of time in which the user is being denied or granted access to the one or more applications from the gateway, the method comprising:
tokenizing, on the processor of the gateway, the timeslot text; and
creating, on the firewall, the blocking rules for the user to the one or more applications from the gateway with the timeslot.

16. The non-transitory computer readable medium according to claim 13, further comprising:
registering, on the gateway, the one or more devices for the user of the gateway; and
associating, on the gateway, the one or more devices for the users in the creating of the blocking rules for the user to the one or more applications from the gateway.

17. The non-transitory computer readable medium according to claim 13, wherein the blocking rules for the user comprises:
blocking, on the gateway, one or more devices of the user from accessing the one or more applications from the gateway; or
granting, on the gateway, the one or more devices of the user access to the one or more applications from the gateway.

18. The non-transitory computer readable medium according to claim 13, further comprising:
implementing, on the gateway, the blocking rules using a user-space utility program.

* * * * *